United States Patent [19]
Johnston

[11] 4,291,261

[45] Sep. 22, 1981

[54] ELECTRICAL LOAD CONTROL CIRCUIT USEFUL IN LIQUID LEVEL CONTROL SYSTEMS

[75] Inventor: Stephen P. Johnston, Detroit Lakes, Minn.

[73] Assignee: S. J. Electro Systems, Inc., Detroit Lakes, Minn.

[21] Appl. No.: 96,550

[22] Filed: Nov. 21, 1979

[51] Int. Cl.³ .............................................. G05B 5/00
[52] U.S. Cl. ................................. 318/482; 307/142; 340/623
[58] Field of Search ............... 318/482; 307/118, 115, 307/112, 141.8, 142, 311; 340/618, 623, 624, 625; 137/392

[56] References Cited

U.S. PATENT DOCUMENTS

| | | | |
|---|---|---|---|
| 2,694,171 | 11/1954 | Campbell | 318/482 |
| 2,697,196 | 12/1954 | Harper | 318/482 |
| 3,070,021 | 12/1962 | Tutthill | 318/482 X |
| 3,602,251 | 8/1971 | Hill | 137/392 |
| 3,662,131 | 5/1972 | Leistiko | 340/623 X |
| 3,832,702 | 8/1974 | Szeverenyi | 307/142 X |
| 3,922,564 | 11/1975 | Kachuk et al. | 307/118 |
| 4,065,227 | 12/1977 | Rose | 307/311 |
| 4,120,611 | 10/1978 | Salve | 318/482 X |

*Primary Examiner*—Ulysses Weldon
*Attorney, Agent, or Firm*—Merchant, Gould, Smith, Edell, Welter & Schmidt

[57] ABSTRACT

Control apparatus for an electrical load device, comprising a relay having a winding and a set of normally open contacts which are closed and opened, after short delays, upon energization and deenergization respectively of the winding, first and second switches arranged to be closed and opened in predetermined sequences, a first circuit for supplying electrical energy from a source to the winding through both the switches series, and a second circuit for supplying electrical energy to the winding and the load device from the source through one of the switches and the contacts of the relay, the second circuit connecting the contacts in parallel with the other of the switches.

4 Claims, 4 Drawing Figures

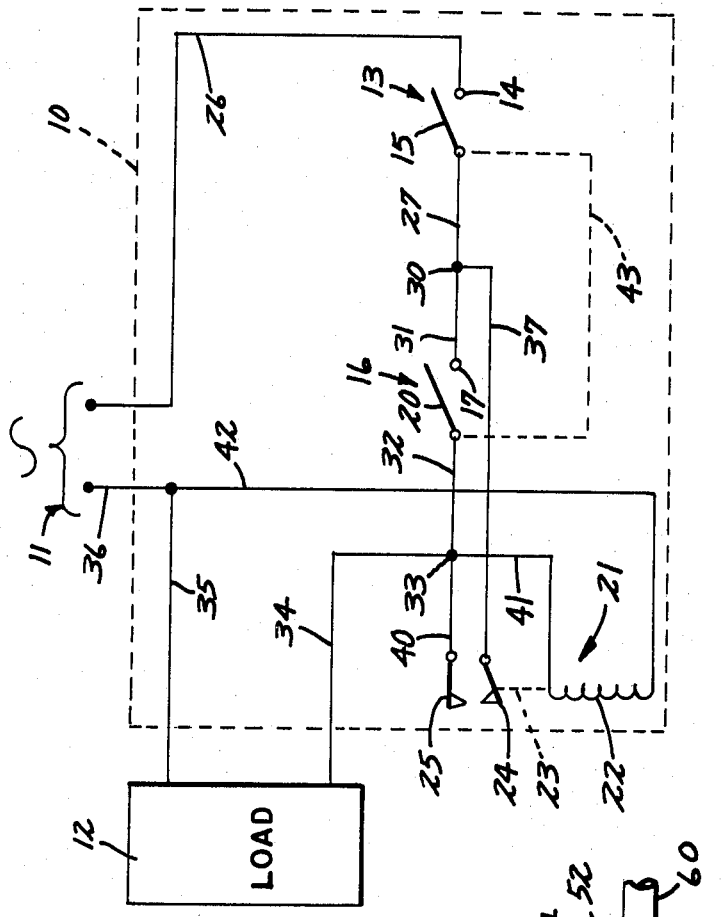
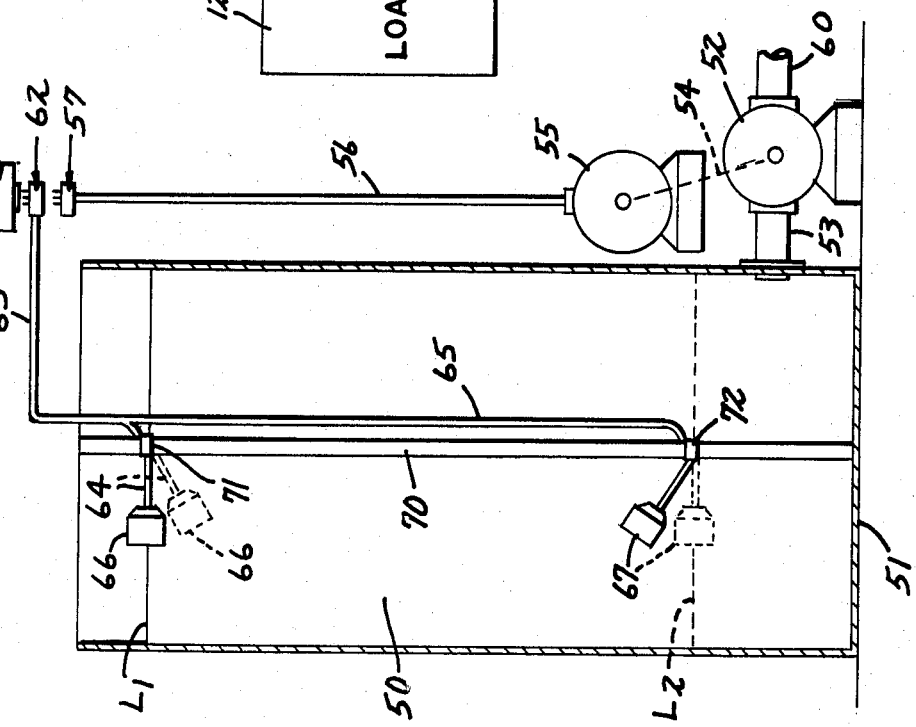
FIG. 1
FIG. 2

ELECTRICAL LOAD CONTROL CIRCUIT USEFUL IN LIQUID LEVEL CONTROL SYSTEMS

TECHNICAL FIELD

This invention relates to the field of electrical engineering, and particularly to an arrangement for controlling the electrical energization of a load device such as the motor of a pump for maintaining the level of a liquid in a chamber within a predetermined range.

BACKGROUND OF THE PRIOR ART

In a typical arrangement of this sort there are provided a motor control relay and pilot switch means for controlling the energization of the relay. The relay contacts make and break the circuit to the motor, and accordingly are subject to arcing and welding by reason of the high starting and breaking currents present. This results in shortened life of the relay, and also requires use of a relay of higher rating and hence of greater cost.

BRIEF SUMMARY OF THE INVENTION

My invention resides in realizing that it is possible to separate circuit making and breaking functions from the circuit maintaining functions, and to arrange for the relay contacts to perform only the latter, thus enabling the use of a relay of lesser rating and consquently lesser cost, and greatly reducing the incidence of relay failure and consequent service calls and charges. I do this by taking advantage of the inherent time delay between the energization of deenergization of a relay winding and the actuation of its contacts, and arranging for the pilot switch means to also perform the circuit making and breaking functions: many applications exist where pilot switches are used which are capable of this, especially circuits where the pilot switch means are mercury switches.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, FIG. 1 is a circuit diagram illustrating the principle of the invention;

FIG. 2 is a schematic showing of my invention applied in a liquid level control system;

DETAILED DESCRIPTION OF THE INVENTION

Figure 3:
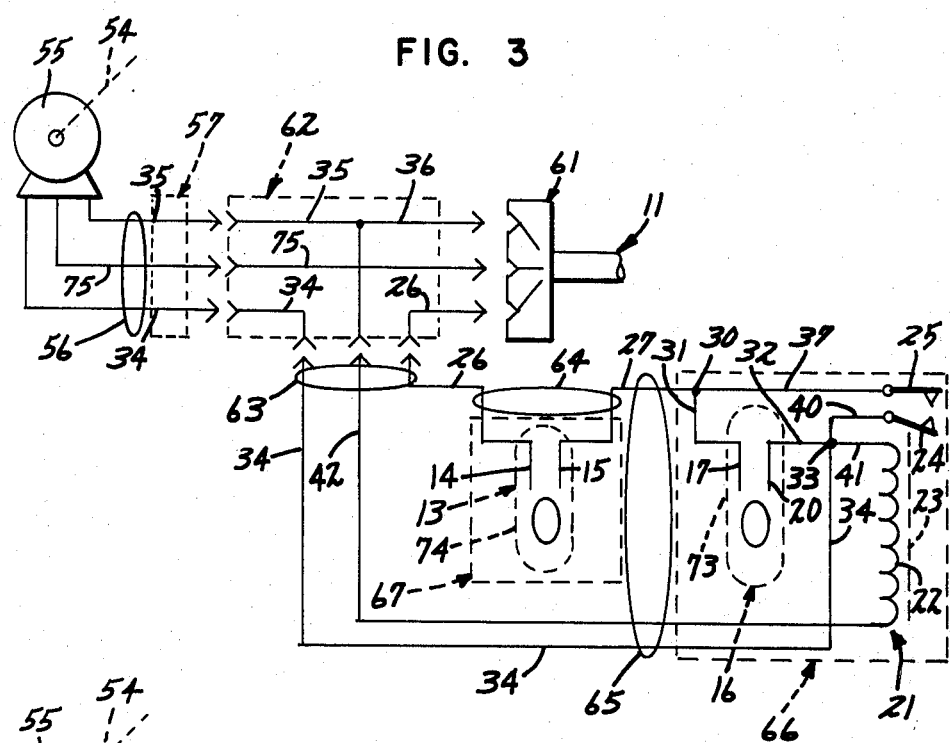
FIG. 3 is a circuit diagram for the system of FIG. 2 when used to prevent the level of the liquid in a chamber from rising above a desired level.

FIG. 1 shows a controller 10 connected between a source 11 of electrical energy and a load 12 such as an electric motor. Controller 10 includes a first single-pole single-throw normally open switch 13 having a fixed contact 14 and a movable contact 15, a second single-pole single-throw normally open switch 16 having a fixed contact 17 and a movable contact 20, and a relay 21 having a winding 22 which actuates an armature 23 to displace a movable contact 24 into engagement with a fixed contact 25.

A first circuit may be traced in FIG. 1 from source 11 through conductor 26, contacts 14 and 15 of switch 13, conductor 27, junction point 30, conductor 31, contacts 17 and 20 of switch 16, conductor 32, junction point 33, and conductor 34 to load 12, the circuit being completed to source 11 through conductors 35 and 36.

A second circuit may be traced from source 11 through conductor 26, switch contacts 14 and 15, conductor 27, junction point 30, conductor 37, relay contacts 24 and 25, conductor 40, junction point 33, and conductor 41 to relay winding 22, the circuit being completed to source 11 through conductors 42 and 36.

It will be evident that relay contacts 24 and 25 are connected in parallel to switch contacts 17 and 20 by conductor 31, junction point 30, and conductor 37, and conductor 32, junction point 33, and conductor 40.

In the arrangement of FIG. 1 switch 13 must be closed before switch 16, and switch 16 must be opened before switch 13: a mechanical connection 43 may be provided for this purpose if desired. Switch 16 must be rated to carry the starting current of load 12, and switch 13 must be rated to break the current of load 12.

FIG. 2 shows an application of my invention where a mechanical interlock between first and second switches is unnecessary. Here it is desired to maintain the level of liquid 50 in a chamber 51 within a range indicated by an upper level $L_1$ and a lower level $L_2$. A pump 52 is connected to chamber 51 by a coupling 53, and is driven through a mechanical connection 54 by a motor 55 energized through a cable 56 and plug 57. The arrangement may be either to pump out liquid when the level reaches $L_1$, or to pump in liquid when the level reaches $L_2$: an appropriate pump 52 for the purpose is to be provided, and a conduit 60 acts in the one case as an outlet and in the other case as an inlet. If desired, elements 52 to 55 may be combined in a submerged pump located within chamber 51, outlet pipe 60 then rising from the pump.

Electrical energy for motor 55, which corresponds to the load 12 of FIG. 1, is supplied at a conventional outlet box 61, and a "piggyback" plug 62 described below is interposed between plug 57 and outlet 61. Plug 62 is connected by cables 63, 64 and 65 to a pair of float switches 66 and 67 mounted at levels $L_1$ and $L_2$ respectively in chamber 51, as by being secured to a suitable vertical member 70 by clamps 71 and 72. If a submerged pump is used, member 70 may comprise the outlet pipe from the pump.

FIG. 3 is a circuit diagram of the system shown in FIG. 2 when used to pump liquids from chamber 51. Here outlet 61 comprises source 11 of FIG. 1, and switching means 16 and 13 of FIG. 1 comprise a pair of normally open mercury switches 73 and 74, the latter being contained in lower float switch 67 of FIG. 2, and the former being contained, with relay 21, in upper float switch 66 of FIG. 2. Source 11 is shown to comprise a conventional three-wire source, and the common ground wire 75 extends through piggyback plug 62 without interruption or tapping. Motor 55 is connected to a pump which draws liquid from chamber 51 and exhausts it at conduit 60.

Figure 4:
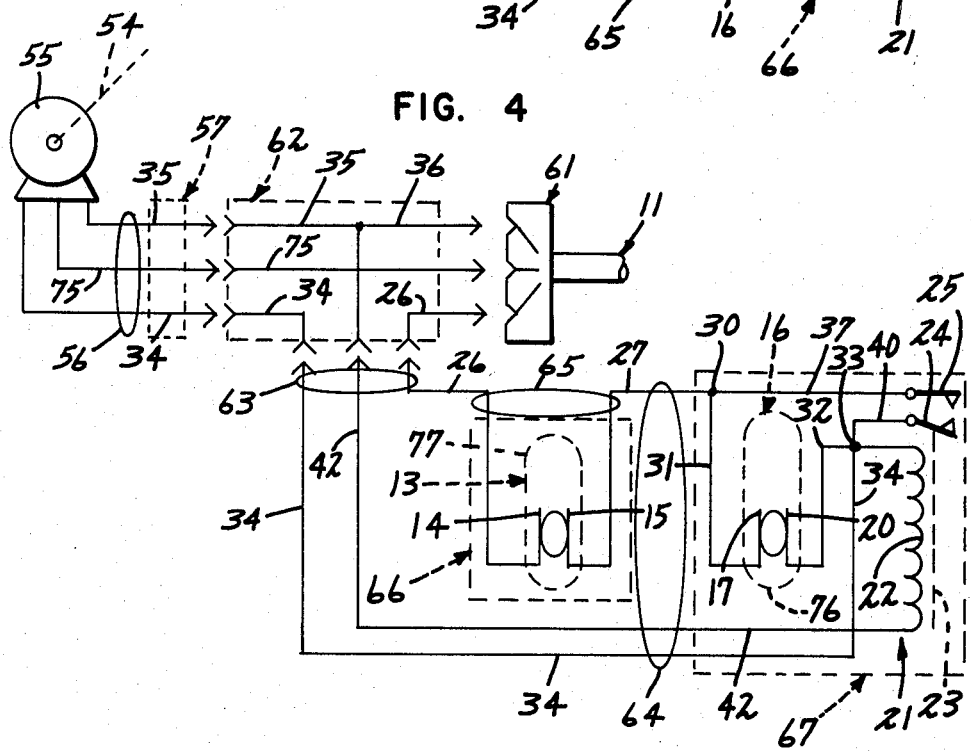
FIG. 4 is a circuit diagram for the system of FIG. 2 when used to prevent the level of the liquid from falling below a desired level.

FIG. 4 is a circuit diagram of the system shown in FIG. 2 when used to pump liquid into chamber 51. Here outlet 61 comprises source 11 of FIG. 1, and switch means 16 and 13 of FIG. 1 comprise a pair of normally-closed mercury switches 76 and 77, the latter being contained in upper float member 66 of FIG. 2, and the former being contained, with relay 21, in lower float switch 67 of FIG. 2. Source 11 is again shown to comprise a conventional three-wire source, and the common ground 75 extends through piggyback plug 62 without interruption or tapping. Motor 55 is connected to a pump which draws liquid from conduit 60 and supplies it to chamber 51.

Float switches usable in connection with FIGS. 3 and 4 are disclosed in my copending patent application filed May 2, 1979, Ser. No. 35,221, which disclosure is incorporated herein by reference. Since the relay is incorporated in one of the float switches, it is desirable that this relay be as small as possible, so that use of a relay of decreased rating and therefore smaller size is decidedly advantageous.

Operation

Turning first to FIG. 1, when switch 13 is closed the circuits to load 12 and relay winding 22 are interrupted at switch contacts 17 and 20 and relay contacts 24 and 25. When switch means 16 is also closed, both the circuit to the relay winding and that to the load are completed, through switch means 16: the load draws a starting current through the switch, and relay contacts 24 and 25 close after a brief delay, in parallel with switch means 16. Switch means 16 may then be opened, and system operation will continue through the relay contacts. When it is desired to deenergize load 12, switch 13 is opened, breaking the circuit before relay contacts 24 and 25 have time to open.

Consider now FIGS. 2 and 3. The rising liquid in chamber 51 is approaching level $L_1$. Float switch 67 has taken its solid line position, in which mercury switch 74 closes, but this did not energize motor 55 or relay 21, as described above. However, when the liquid reaches level $L_1$, float switch 66 has reached its solid line position, in which mercury switch 73 closes, energizing relay winding 22 and motor 55: relay contacts 24 and 25 close after the initial starting current has passed. Pump 52 is now driven to draw liquid from chamber 51: as the level falls float switch 66 returns to its broken line position in which mercury switch 73 is opened, but the circuits to the relay and motor are maintained by relay contacts 24 and 25. When the liquid reaches level $L_2$, float switch 67 returns to its broken line position, mercury switch 74 breaks the circuit to the relay and the motor, and then relay contacts 24 and 25 open, after the circuit breaking is accomplished by switch 74.

Operation is very similar in FIGS. 2 and 4. The falling liquid in chamber 51 is approaching level $L_2$. Float switch 66 has taken its broken line position, in which mercury switch 77 closes, but that did not energize motor 55 or relay 21, as described above. However, when the liquid reaches level $L_2$, float switch 67 has reached its broken line position, in which mercury switch 76 closes, energizing relay winding 22 and motor 55: relay contacts 24 and 25 close after the initial starting current has passed. Pump 52 is now driven to supply liquid from conduit 60 to chamber 51: as the level rises, float member 67 returns to its solid line position, in which mercury switch 76 is open, but the circuits to the relay and the motor are maintained by relay contacts 24 and 25. When the liquid reaches level $L_1$, float switch 66 returns to its solid line position, mercury switch 77 breaks the circuit to the relay and the motor, and then relay contacts 24 and 25 open, after the circuit breaking is accomplished.

From the foregoing it will be evident that I have invented an arrangement whereby the contacts of a relay are relieved of circuit making and breaking functions and perform only a circuit maintaining function, in circuits where a pair of switch means are used to control the relay and the motor, as well as a liquid level control apparatus using the new arrangement.

What is claimed is:

1. Apparatus for maintaining the level of liquid in a chamber between upper and lower levels, comprising, in combination:
    a pump for causing flow of liquid with respect to the chamber;
    an electric motor energizable to cause operation of said pump;
    and means for controlling the energization of said motor including a relay, having a winding and a set of normally open contacts which are closed and opened, after short delays, upon energization and deenergization respectively of said winding, first switch means and second switch means responsive respectively to the presence of liquid at upper and lower levels in said chamber, first circuit means for supplying electrical energy from a source to said winding and said motor through said first switch means and said second switch means in series, and a second circuit means for supplying electrical energy from said source to said motor and said winding through one of said first and second switch means and said contacts of said relay, said second circuit means connecting said contacts in parallel with the other of said first and second switch means, so that initial energization of said motor and relay as said liquid reaches one of said levels is accomplished by the closing of said first and second switch means in series and initial deenergization of said motor and relay as said liquid reaches the other of said levels is accomplished by the opening of said one of said switch means, with both said energization and deenergization occurring during said delays by said switch means rather than by said contacts.

2. Apparatus according to claim 1 in which said first and said second switch means are both normally open, said second circuit means includes said second switch means, and said pump operates to cause flow of liquid out of said chamber.

3. Apparatus according to claim 1 in which said first and said second switch means are both normally closed, said second circuit means includes said first switch means, and said pump operates to cause flow of liquid into said chamber.

4. Control apparatus for an electrical load device comprising, in combination:
    a relay, having a winding and a set of normally open contacts which are closed and opened, after short delays, upon energization and deenergization respectively of said winding;
    first switch means and second switch means to be closed and opened in predetermined sequences; first circuit means for supplying electrical energy from a source to said winding and said load device through both said first and second switch means in series;
    and second circuit means for supplying electrical energy from said source to said winding and said load device through one of said first and second switch means and said contacts of said relay, said second circuit means connecting said contacts in parallel with the other of said first and second switch means.

* * * * *

UNITED STATES PATENT AND TRADEMARK OFFICE
CERTIFICATE OF CORRECTION

PATENT NO. : 4,291,261
DATED : September 22, 1981
INVENTOR(S) : Stephen P. Johnston It is certified that error appears in the above—identified patent and that said Letters Patent is hereby corrected as shown below:

In the Abstract, line 8, after the word "switches" insert the word --in--.

Signed and Sealed this

Second Day of February 1982

[SEAL]

Attest:

GERALD J. MOSSINGHOFF

*Attesting Officer*  *Commissioner of Patents and Trademarks*